Figure 1:
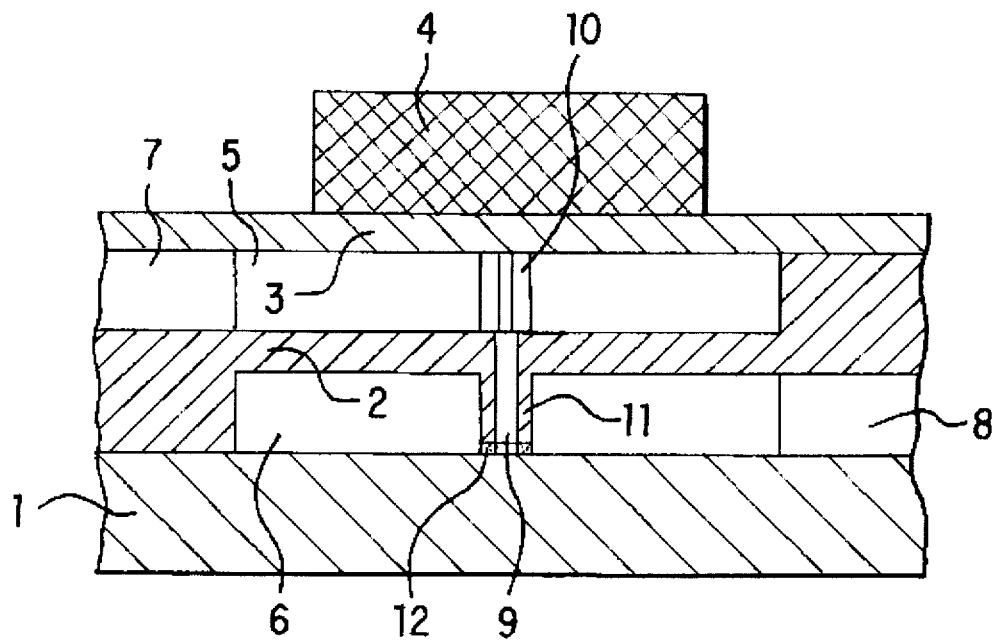

United States Patent [19]

Joswig

[11] Patent Number: 5,538,221
[45] Date of Patent: Jul. 23, 1996

[54] MICROMECHANICAL VALVE FOR MICROMECHANICAL DOSING DEVICES

[76] Inventor: Juergen Joswig, Zoellmener Str. 14, 01157 Dresden, Germany

[21] Appl. No.: 240,736

[22] PCT Filed: Nov. 19, 1992

[86] PCT No.: PCT/DE92/00976

§ 371 Date: May 12, 1994

§ 102(e) Date: May 12, 1994

[87] PCT Pub. No.: WO93/10385

PCT Pub. Date: May 27, 1993

[30] Foreign Application Priority Data

Nov. 23, 1991 [DE] Germany .............. 41 38 491.1

[51] Int. Cl.⁶ .................................................. F16K 7/14
[52] U.S. Cl. .......................... 251/129.17; 251/129.07; 251/368
[58] Field of Search ............. 251/129.17, 129.07, 251/368, 129.01, 129.06

[56] References Cited

U.S. PATENT DOCUMENTS

| 4,826,131 | 5/1989 | Mikkor . |
| 5,085,562 | 2/1992 | van Lintel . |
| 5,176,358 | 1/1993 | Bonne et al. ............... 251/368 X |
| 5,216,273 | 6/1993 | Doering et al. ........... 251/129.17 X |

FOREIGN PATENT DOCUMENTS

| 0392978 | 10/1990 | European Pat. Off. . |
| 0426612 | 5/1991 | European Pat. Off. . |
| 3814150 | 11/1989 | Germany . |
| 3936647 | 10/1990 | Germany . |
| 3919876 | 12/1990 | Germany . |

OTHER PUBLICATIONS

Patent Abstracts of Japan, vol. 15, No. 290 (M–1139) 1991 of Japan 31 03 680 (Yokogawa).

*Primary Examiner*—Kevin Lee
*Attorney, Agent, or Firm*—Jordan and Hamburg

[57] ABSTRACT

The object is to be achieved according to the invention that media can be switched on and off in extremely small dosing, over a variable time period, with high reliability and stable mode of operation.

The new micromechanical valve consists essentially of three layers (1, 2, 3) arranged one above the other, the central layer being designed as a valve diaphragm (2) and the upper layer as a thin drive diaphragm (3). On the drive diaphragm (3), an actuation element (4) for the activation of the valve is arranged. The valve diaphragm (2) has channel-forming and chamber-forming structures for inlet and outlet formed in both sides, has a centre passage (9) and, in its central region, is connected unreleasably to the drive diaphragm (3) and releasably to the base layer (1) without thereby restricting the throughflow of the medium via inlet channel (5), inlet chamber (6), passage (9) and, in the active state, outlet chamber (6) and outlet channel (8).

13 Claims, 2 Drawing Sheets

MICROMECHANICAL VALVE FOR MICROMECHANICAL DOSING DEVICES

The invention relates to a micromechanical valve for micromechanical dosing devices, consisting essentially of at least three layers which are arranged one above the other, are connected unreleasably to one another and are coupled to an actuation element for activating the valve, the layers having planar structures for forming inlet and outlet channels and inlet and outlet chambers, the central layer being arranged as separating layer between the inlet and outlet and the outer layers being arranged as base layer and cover layer, respectively.

Such micromechanical valves are provided in particular for use in medical technology, for example for medication dosing or in laboratory analytical technology, but also in the automotive industry, the aerospace industry or the printing industry.

Micromechanical valves with multilayer structure are known from the literature, which can be produced by means of production technologies such as are used in the semiconductor industry. Said valves possess two pressure-medium connections and a valve seat which is connected between them and to which a closure element is assigned. In this arrangement, the closure element can be deflected by electrical or thermal actuation means and be moved against the electrical or thermal actuation means by means of a resilient diaphragm which is firmly connected to the closure element. The resilient diaphragm is integrated in one of the layers and adjoins a space acted on by pressure medium. For the pressure-force equalization, there is arranged a pressure-equalization surface acting against the diaphragm acted on by pressure.

By means of this solution, however, not complete pressure compensation but only a partial pressure equalization is achieved, since the compensation surface is significantly smaller than the surface to be compensated. The poor sealing behaviour of the valves is also disadvantageous because of the large circumference of the valve gap, since the closure element has to seal the inlet chamber over its entire width. In addition, when the valve is actuated, it passes through an unstable state, since the subatmospheric pressure below the compensation surface is suddenly relieved at the moment of opening. The dynamic loads thus occurring act at the connection points of the valve seat and compensation surface, having a negative effect on the expected lifetime of the valves. The production of such valves requires an elaborate and complicated structuring and assembly technology, only a narrow fault tolerance being permissible.

The object of the invention is therefore to develop a micromechanical valve for micromechanical dosing devices which switches media on and off variably, with extremely small dosing, over a long period of time with high reliability and a stable mode of operation, the valve being constructionally designed such that, by uniform activation with a small energy requirement, it allows the use of small, effective drive elements, has a small space requirement and can be produced by means of simple assembly technologies.

The object is achieved according to the invention in that the separating layer is designed as a thin, elastic valve diaphragm with channel-forming and chamber-forming structures for inlet and outlet formed in both sides. It has a centre passage and is unreleasably connected to the cover layer in its central region and is connected to the base layer releasably in such a manner that the throughflow for the medium is ensured via inlet channel, inlet chamber, passage and, in the opened state, outlet chamber, outlet channel. The actuation element is in this arrangement arranged on the cover layer designed as a thin drive diaphragm.

According to the further embodiment for achieving the object according to the invention, all channel-forming and chamber-forming structures for inlet and outlet are formed in both sides of the separating layer in such a manner that the centres of gravity of their areas lie one above the other and the remaining residual layer forms the valve diaphragm. In this case, the inlet chamber has essentially the same shape and size as the outlet chamber.

According to a further embodiment of the invention, the inlet chamber is arranged between the drive diaphragm and the valve diaphragm and the outlet chamber is arranged between the valve diaphragm and base layer. The inlet and outlet channel are disposed opposite one another in an offset manner.

Furthermore, at least one connection element projecting into the inlet chamber as far as the drive diaphragm is arranged in the central region of the valve diaphragm, encircling the passage designed as passage hole, and is connected unreleasably to the drive diaphragm. At the outlet side, a valve wall is arranged in the central region of the valve diaphragm, encircling the passage hole, which valve wall bears against the inner surface of the base layer in the non-actuated state.

In a further embodiment, a thin layer of non-bondable material, such as silicon oxide or silicon nitrite, is arranged between the bearing surface of the valve wall and the inner surface of the base layer.

According to a further embodiment of the invention, the base layer, valve diaphragm and drive diaphragm are preferably unreleasably connected to one another by means of anodic bonding. In this arrangement, the base layer and the drive diaphragm preferably consist of a thermally adapted glass material and the valve diaphragm of a semiconducting silicon substrate.

According to another development of the invention, the cover layer consists of a semiconducting silicon substrate, in the outer surface of which a recess is formed for the actuation element, the remaining layer forms the drive diaphragm and the inlet and outlet chamber are designed differently in shape and size. The cover layer and separating layer are in this case unreleasably connected to one another by means of wafer bonding and the separating layer is unreleasably connected to the base layer by means of anodic bonding.

The actuation elements provided are piezoelectric diaphragm excitation elements, preferably in the form of a piezodisc applied to the drive diaphragm, but also thermoelectric or electrostatic activation variants.

Figure 2:
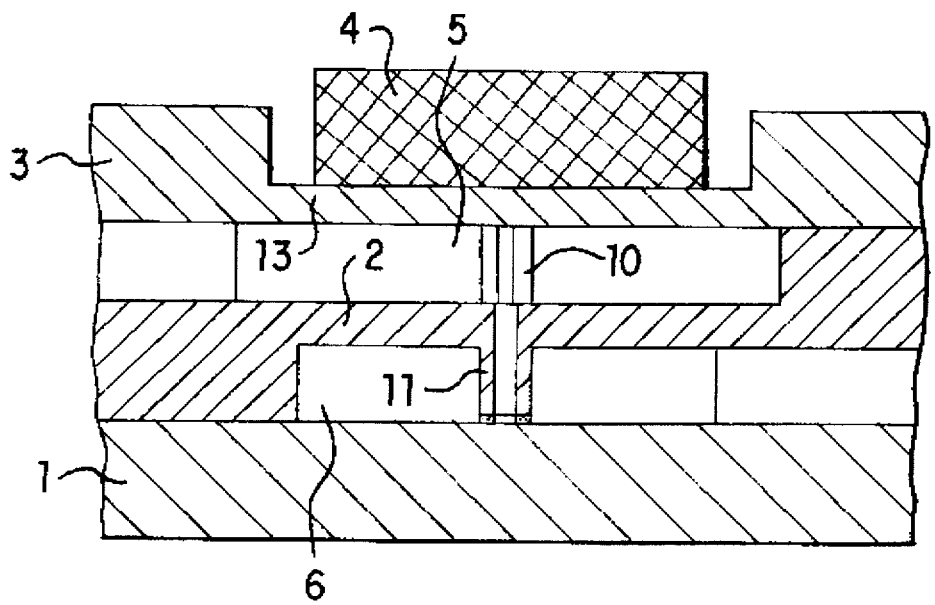
Figure 3:
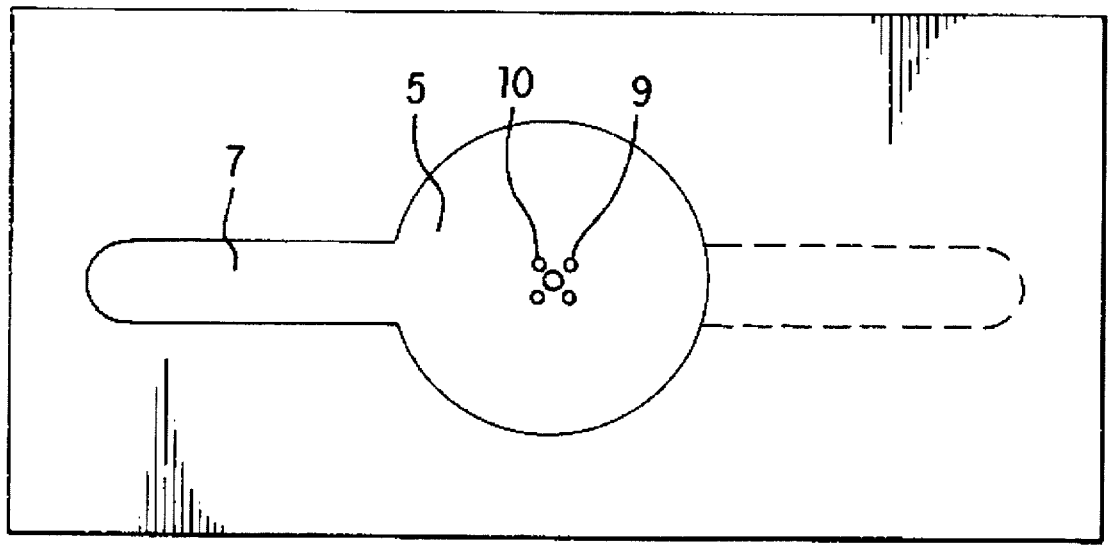
Figure 4:
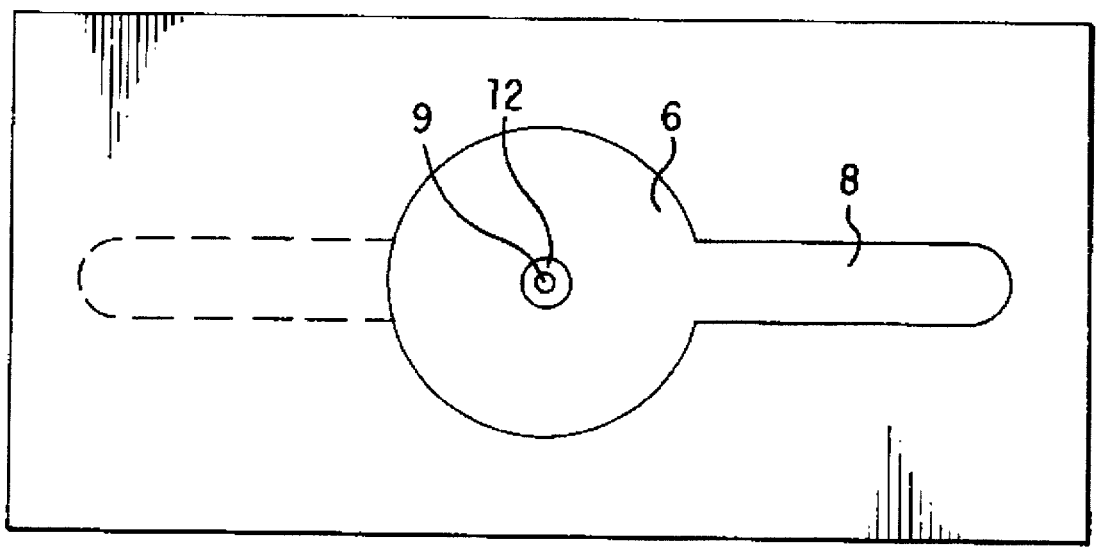

The invention will be explained in greater detail below with reference to an exemplary embodiment. In the associated drawings:

FIG. 1 shows a diagrammatic sectional view of an embodiment of the micromechanical valve according to the invention, FIG. 2 shows a diagrammatic sectional view of another embodiment of the valve according to the invention, FIG. 3 shows a view of the valve diaphragm at the inlet side, and FIG. 4 shows a view of the valve diaphragm at the outlet side.

The exemplary embodiment describes valve variants which are provided specifically for use in medical technology, in the field of microdosing of medicaments. The active substance dosing systems are in this case to apply the active substance externally or internally, in a fixed-programmed, open-loop controlled or closed-loop controlled manner in the amount and quality necessary for the therapy and according to the predetermined time plan. Foremost are both the best possible adaptation to the physiological circumstances of the patients, for example in the case of insulin therapy, and also optimum process control, such as is necessary in particular in pain therapy.

This results in high requirements which concern in particular also the micromechanical valves to be employed and lie in particular in a high system reliability, a further miniaturization of the elements, in optimum material use and low energy consumption.

According to FIG. 1, the micromechanical valve according to the invention consists of three layers arranged one above the other and connected to one another unreleasably by means of anodic bonding. The cover layer, which is designed as a thin drive diaphragm 3, and the base layer 1 are both made of a thermally adapted glass material. On the outer surface of the drive diaphragm 3, there is adhesively bonded an actuation element 4 in the form of a piezoelectric element which effects the activation of the valve.

Both layers 1 and 3 are firmly bonded to the separating layer designed as a thin valve diaphragm 2. It is made from a silicon substrate, such as is known from semiconductor technology. Into both sides of the separating layer all channel-forming and chamber-forming structures are formed in such a manner that—corresponding to the illustration according to FIG. 1—an inlet chamber 5 is arranged over the entire effective width of the piezoelectric element 4, below the drive diaphragm 3, and an outlet chamber 6 is arranged over the base layer 1. The centres of gravity of the surfaces of both chambers 5 and 6 lie one above the other. The layer thickness remaining in the active region of the separating layer acts as valve diaphragm 2. The inlet channel 7 is arranged laterally between the drive diaphragm 3 and valve diaphragm 2 and the outlet channel 8 is arranged offset opposite the inlet channel 7, between the valve diaphragm 2 and base layer 1. The lateral inlet and outlet thus safeguards the use of the valve within complex systems.

As shown in FIGS. 3 and 4, the valve diaphragm 2 has a centre passage hole 9 and, at the inlet side, encircling the passage hole 9 a plurality of cylindrical connection elements 10 which are arranged at a distance from one another, project through the inlet chamber 5 and are firmly connected to the drive diaphragm 3. At the outlet side, a valve wall 11 is arranged encircling the passage hole 9, which valve wall 11, in the closed state, bears against the inner surface of the base layer 1. To prevent the valve wall 11 being unreleasably connected to the base layer 1 during the bonding process, a thin layer 12 of silicon oxide is applied to that surface of the valve wall 11 bearing against the base layer 1. It is thereby also achieved that the valve seals reliably in the closed state.

The valve functions in the following manner: in the resting state, the valve wall 11, in the outlet chamber 6, rests on the base layer 1, the valve is closed. The pressure of the medium flowing in acts against both approximately equally sized pressure surfaces of the drive diaphragm 3 and valve diaphragm 2, which are firmly connected to one another in the centre. The pressure equalization of the inlet pressure, which is independent of the position of the valve wall 11, takes place by this means. On activation by the piezoelectric element 4, the piezoelectric element 4, drive diaphragm 3 and the valve diaphragm 2 are curved or bent, the valve wall 11 is lifted from the base layer 1 and the throughflow from the inlet chamber 5 into the outlet chamber 6 is clear. The opening state of the valve is thus dependent only on the drive voltage of the piezoelectric element 4. The drive power may be limited to the extent necessary for deflecting the valve diaphragm 2 in the opened state, permitting simple and small designs for actuation elements 4.

FIG. 2 shows a further embodiment of the micromechanical valve according to the invention. According to this, a variable design of the surface ratio of drive diaphragm 3 and valve diaphragm 2 is possible by the fact that the cover layer consists of a silicon substrate layer, from the outer surface of which the active, thin drive diaphragm surface 13 is worked, the recess serving simultaneously to receive the piezoelectric disc 4. The unreleasable connection of the three layers is carried out in such a manner that the cover layer is connected by means of wafer bonding to the separating layer and the separating layer is connected to the base layer by anodic bonding. The inlet chamber 5 and outlet chamber 6 may be differently sized in their dimensions. By this means, a complete compensation of the influence of the inlet pressure is likewise possible. In addition, as part of the design possibilities, any dependencies of the position of the valve wall 11 on the inlet pressure can be obtained.

By means of the micromechanical valve according to the invention, it is prevented that, at the moment at which the valve is opened, an unstable state results in the outlet chamber 6 as a result of sudden relief of the subatmospheric pressure, since the medium first reaches the outlet chamber 6 via the passage hole 9. The valve can be produced using normal assembly outlay, the actuation elements 4 to be used may be chosen depending on the application and required parameters. Both piezoelectric and thermoelectric or electrostatic actuation elements 4 in the simplest form and smallest design can be used.

I claim:

1. A micromechanical valve for micromechanical dosing devices, comprising:

at least three layers disposed one above the other and connected unreleasably to one another at adjoining surfaces;

said three layers including a cover layer having an actuation element coupled thereto;

the three layers further including a base layer and a central layer forming a planar structure defining inlet and outlet channels and inlet and outlet chambers;

the central layer being arranged as a separating layer between the inlet channel and chamber and the outlet channel and chamber wherein the central layer is interposed between the base layer and the cover layer;

the separating layer being a thin, elastic valve diaphragm with a channel-forming and chamber-forming configuration for defining said inlet chamber and channel and said outlet chamber and channel in opposing sides of said central layer;

the separating layer having a centre passage, a central region connected unreleasably to the cover layer where the cover layer is a thin drive diaphragm; and the central region connected releasably to the base layer such that a medium can flow through the inlet channel to the inlet chamber and no further than the center passage when in a closed state wherein the separating layer is connected to the base layer to prohibit further flow, and when in an open state wherein the separating layer is disconnected from the base lawyer, the medium can flow from the inlet chamber through the centre passage into the outlet chamber, and from the outlet chamber into the outlet channel from which the medium exists the micromechanical valve; and the actuation element being coupled to the cover layer at an outer surface of the thin drive diaphragm to connect and disconnect said separate layer from said base layer via the central region of the separating layer being connected unreleasably to the cover layer.

2. A micromechanical valve according to claim 1, wherein the separating layer has formed in both sides thereof all structure comprising the elastic valve diaphragm and chamber-forming structures for the inlet and outlet channels and chambers such that the centres of gravity of the inlet and outlet chambers lie above one another.

3. A micromechanical valve according to claim wherein the inlet and outlet chamber have essentially the same shape and size.

4. A micromechanical valve according to claim 1 wherein the inlet chamber is arranged between the drive diaphragm and the valve diaphragm and the outlet chamber is arranged between the valve diaphragm and base layer, and in that the inlet channel and the outlet channel are disposed opposite one another in a laterally offset manner.

5. A micromechanical valve according to claim 1 wherein at least one connection element projects into the inlet chamber from the cover layer as far as the drive diaphragm and is connected unreleasably to the drive diaphragm in the central region of the valve diaphragm proximate the centre passage.

6. A micromechanical valve according to claim 1, wherein:

a valve wall is arranged irk the central region of the valve diaphragm, encircling the centre passage at the outlet side: and the valve wall (11) bears against an inner surface of the base layer in a non-actuated state.

7. A micromechanical valve according to claim 6 wherein:

a thin layer of non-bondable material is disposed between the bearing surface of the valve wall and the inner surface of the base layer.

8. A micromechanical valve according to claim 1 wherein the base layer, the central layer and the cover layer are unreleasably connected to one another by means of anodic bonding.

9. A micromechanical valve according to claim 1 wherein the base layer and the thin drive diaphragm are formed of a thermally adapted glass material and the elastic valve diaphragm is formed of a semiconducting silicon substrate.

10. A micromechanical valve according to claim 1, wherein:

the cover layer is formed from a semiconducting silicon substrate and has a recess for the actuation element formed in the outer surface thereof and defines the drive diaphragm; and the inlet chamber and the outlet chamber differ in shape and size.

11. A micromechanical valve according to claim 10 wherein:

the cover layer and separating layer are connected unreleasably by means of wafer bonding; and the separating layer is connected unreleasably to the base layer by anodic bonding.

12. A micromechanical valve according to claim 1, wherein a piezoelectric diaphragm excitation element is the actuation element and adhesion bonding fixes the actuation element onto the outer surface of the drive diaphragm.

13. A micromechanical valve according to claim 1, wherein thermoelectric or electrostatic diaphragm excitation elements are arranged on the drive diaphragm for activation of the valve diaphragm.

* * * * *